United States Patent [19]

Biswas et al.

[11] Patent Number: 4,928,306

[45] Date of Patent: May 22, 1990

[54] DYNAMICALLY CONFIGURABLE TELEPHONE

[75] Inventors: Gautam Biswas; David C. Black; Michael G. Duncan, all of Austin; Gary R. Key, Round Rock; Gordon D. Leak, Austin; Robert D. Whittington, Pflugerville, all of Tex.

[73] Assignee: International Business Machines Corporation, Armonk, N.Y.

[21] Appl. No.: 317,256

[22] Filed: Feb. 28, 1989

[51] Int. Cl.⁵ .............................................. H04M 3/42
[52] U.S. Cl. .................................... 379/201; 379/390; 379/391; 370/60; 370/62
[58] Field of Search ................ 379/201, 202, 203, 204, 379/205, 387, 390, 391, 210, 211, 212, 213, 214, 215; 370/58, 60, 62

[56] References Cited

U.S. PATENT DOCUMENTS

| | | |
|---|---|---|
| 4,161,633 | 7/1979 | Treiber . |
| 4,585,904 | 4/1986 | Mincone et al. ........................ 379/88 |
| 4,636,939 | 1/1987 | Fildes .................................. 364/200 |
| 4,642,805 | 2/1987 | Dumas et al. ........................ 370/58 |
| 4,718,080 | 1/1988 | Serrano et al. ...................... 379/59 |
| 4,722,082 | 1/1988 | Furuya et al. ...................... 370/85 |
| 4,741,026 | 4/1988 | Baxter et al. ....................... 379/204 |
| 4,748,654 | 5/1988 | Gray .................................. 379/40 |
| 4,782,514 | 11/1988 | Oshikata et al. ..................... 379/165 |
| 4,788,720 | 11/1988 | Brennan et al. ..................... 379/201 |

Primary Examiner—James J. Dwyer
Attorney, Agent, or Firm—Perman & Green

[57] ABSTRACT

A dynamically configurable telephone 10 has an intelligent controller 42 which implements a communication protocol to receive commands and parameters and to transmit status indicative of particular phone features. Upon receipt of the parameters, the controller translates the parameters into configuration settings for the telephone and also stores the parameters in a non-volatile memory 44 if such is installed. The telephone accommodates many different country-specific requirements without hardware or firmware changes being made to the phone itself. The controller returns solicited or unsolicited status messages, or events, to a PABX 14 over a bit serial digital data link 12. An event can be indicative of error conditions, such as data packet errors, timeouts, or data storage errors. An event can also be a reply to a previously received command, such as configuration status, internal test results, a phone serial number or a controller firmware revision level.

31 Claims, 3 Drawing Sheets

4,928,306

DYNAMICALLY CONFIGURABLE TELEPHONE

FIELD OF THE INVENTION:

This invention relates generally to telephony apparatus and, in particular, to a telephone which is loaded from a remote location with unique, country-specific, parameters such as transmission levels or loss plan(s), keyscanning requirements and audible feedback tone requirements.

BACKGROUND OF THE INVENTION:

Conventional practice with telephone equipment typically supports the shipment of phones to various countries by developing different models of the phone for each unique loss plan and each keyboard scanning requirement. As a result it becomes necessary to develop a large number of different models of a particular phone if world-wide distribution of the phone is to occur.

It can be appreciated that a desirable goal is the provision of a telephone which meets all of the safety agency requirements of all countries, and which also allows the unique, country-specific, parameters of the phone to be downloaded from a Private Automatic Branch Exchange, or PABX, to which the phone is coupled. Included among these unique parameters are a loss plan or plans, keyscanning requirements, feedback tone requirements and companding method (A-Law or u-Law).

It can also be appreciated that if it is desirable to download and store the telephone'loss plan then it would also be desirable to download and store other parameters that may be unique to a particular phone, such as the phone's programmable dialing sequences, class of service, and so on. This downloading of unique phone parameters would allow for an improved phone system. Additionally it may be desirable to locally store the phone's serial number in non-volatile memory and read back the serial number in order to assist in capital asset tracking and as an aid in identifying the phone, and possibly the user of the phone, if the phone is moved to a different location within a facility.

It is therefore one object of the invention to provide a telephone which allows these and other parameters to be downloaded to and stored within the telephone.

It is another object of the invention to provide a protocol which enables the downloading of parameters from a telephone switching apparatus to a telephone.

It is another object of the invention to provide a protocol which enables the downloading of information from a telephone switching apparatus to a telephone and the subsequent reading back by the telephone switching apparatus of the previously stored information.

It is one further object of the invention to provide apparatus for and a method of bidirectionally communicating between a telephone and a PABX which includes the local non-volatile storage of downloaded and other parameters within the telephone.

SUMMARY OF THE INVENTION

The foregoing problems are overcome and other advantages are realized by, in accordance with the invention, a dynamically configurable telephone have an intelligent controller which implements a communication protocol to receive parameters and transmit status indicative of particular phone features, the data being transmitted as packets of data bytes. Each packet includes a checksum byte for verifying the data integrity of the packet. Upon receipt of the parameters, the controller translates the parameters into configuration settings for the telephone and also stores the parameters in a non-volatile memory if such is installed. The invention provides a telephone which accommodates many different country-specific requirements without hardware or firmware changes being made to the phone itself. The controller returns solicited or unsolicited status messages, or events, to a PABX. The events can be indicative of error conditions, such as data packet errors, timeouts, or data storage errors. An event can also be a reply to a command previously received from the PABX, the reply being by example a configuration status, internal test results, a phone serial number or a controller firmware revision level.

In accordance with method and apparatus of the invention there is disclosed a telephone which includes apparatus for communicating telephone related information in a bidirectional manner with a telephone exchange and which further includes apparatus, coupled to the communicating apparatus, for receiving telephone related information therefrom, the telephone related information including information for specifying at least one operational configuration of the telephone. The receiving apparatus further includes apparatus for configuring the telephone in accordance with the received information.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF THE INVENTION

Figure 1:
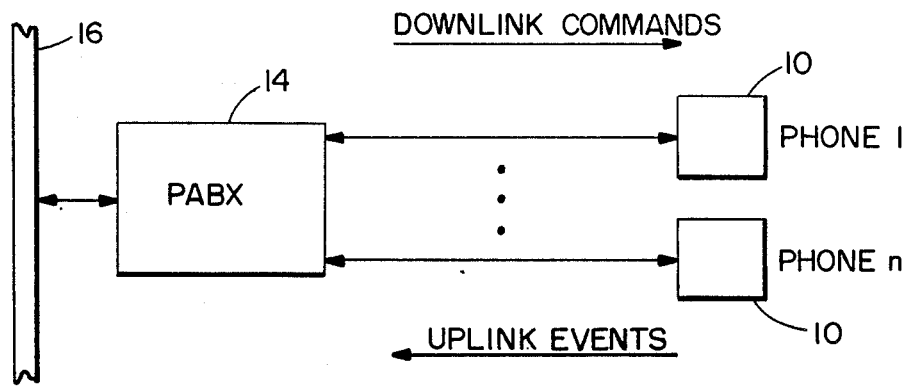
FIG. 1 is a block diagram showing a plurality of telephones 10 coupled to a PABX 14 via twisted pairs 12.

Referring first to FIG. 1 there is shown a plurality of telephones 10 (Phone 1-Phone n) each of which is coupled via a single twisted pair bit serial data link 12 to a PABX 14. The PABX 14 is further coupled to a telephone trunk 16. Digital voice and control signals are bidirectionally passed over the links 12. In addition, 48 volt DC phone operating power is provided in a downlink direction from the PABX 14 to the phones 10. In a typical application the PABX 14 can be coupled to a large number of the phones 10. The PABX 14 is typically provided on-site with the phones 10 and includes a data processor having local storage of telephone related configuration parameters, the data processor including communication devices for bidirectionally communicating over the links 12 with the telephones 10.

Suitable digital link apparatus for providing digital communications between a branch exchange and a telephone station set is disclosed in U.S. Pat. No. 4,642,805, issued Feb. 10, 1987 to G.P. Dumas et al. and assigned to the assignee of this patent application. The disclosure of this U.S. Patent is incorporated herein by reference in its entirety.

Figure 2:
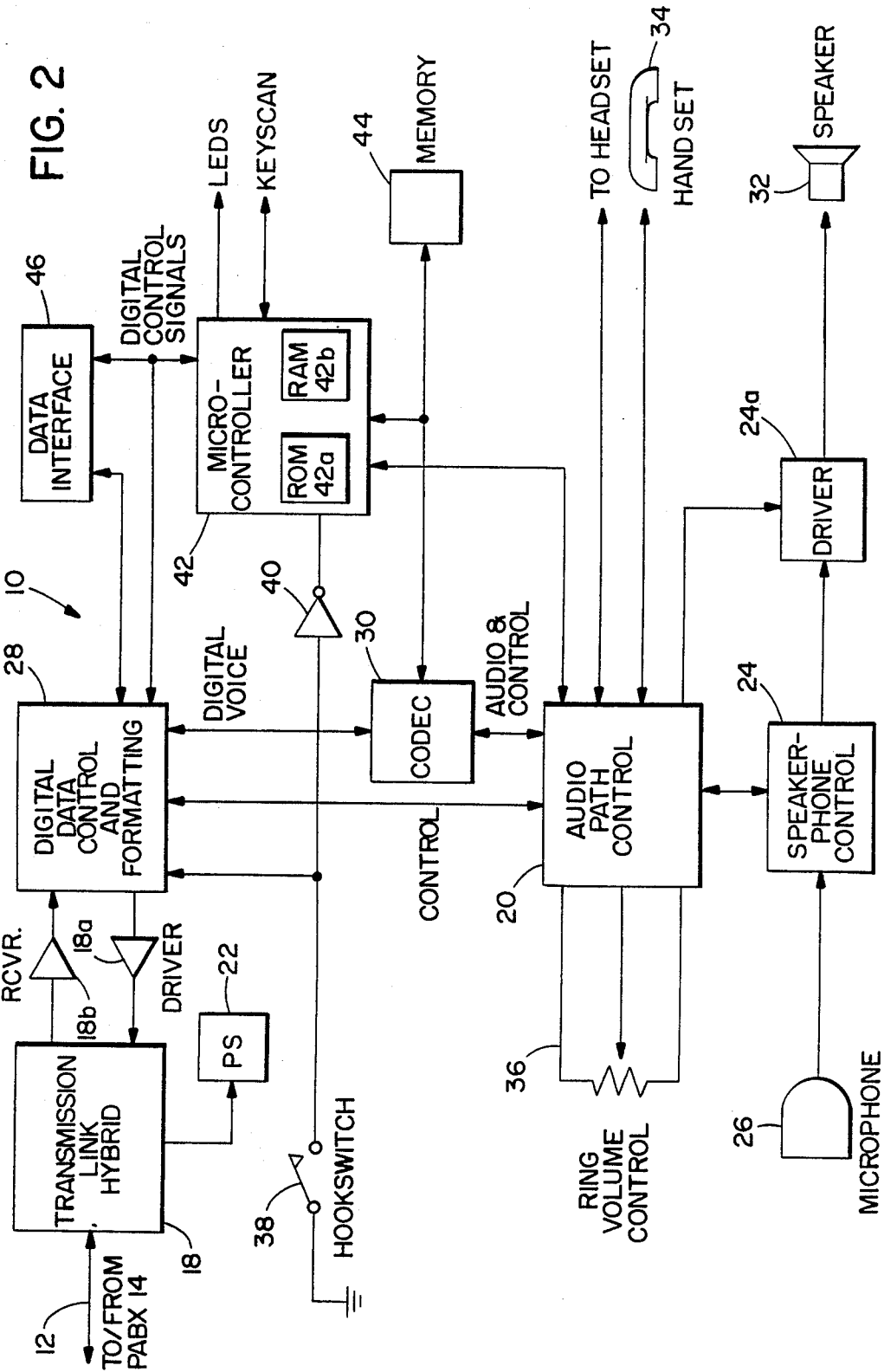
FIG. 2 is block diagram of a telephone constructed and operated in accordance with the invention, the telephone being bidirectionally coupled to the PABX 14 by the bit serial digital link 12.

Referring to FIG. 2 there is shown in block diagram form one of the phones 10. Link 12 is connected to a hybrid circuit 18 which includes a transformer (not shown) and line impedance matching network (not shown). The function of the hybrid 18 is to separate the received digital signal information from the transmitted digital signals and to also extract forty-eight volt DC power from the link 12. The forty-eight volts power is fed to the power supply 22 which in turn converts it to a regulated +5 and −5 volts DC power for the other components of the phone 10. The transmitted and received digital signals originate from and are input to a digital data control and formatting device 28. Device 28 further separates the signals onto four main data paths to provide the required signals for the various elements of the phone 10. One data path conveys digital voice information to and from a CODEC 30 (analog to digital encoder and decoder). A second data path is coupled to an optional data interface 46, which can be employed to allow a digital interface to a data processing device such as a personal computer A third data path includes several control lines coupled to an audio path control circuit 20, circuit 20 also connecting to an audio input and output of the CODEC 30. The audio path control circuit 20 switches audio signals to a handset 34, a headset or to a speakerphone. The speakerphone includes a microphone 26 and a speaker 32 which connect to the audio path control circuit 20 through a speakerphone control device 24 and a speaker driver 24a. The speakerphone control device 24 may be an analog implementation, as shown, or a digital signal processing device in which case it would connect between the CODEC 30 and the digital data control device 28.

The fourth data path from the digital data control device 28 includes digital control signals which are passed to and from a microcontroller 42. The microcontroller 42 is also connected through a bidirectional digital control path to the CODEC 30 and an optional non-volatile memory device 44. The microcontroller has an internal ROM 42a for control program and permanent data storage (firmware), as well as internal RAM 42b for working data storage. The microcontroller 42 also connects to a matrix of keyboard switches and LEDs to perform telephone dialpad and operational status display functions.

The CODEC 30 employed in a presently preferred embodiment of the invention has variable gain amplifiers which are programmed through the control path from the microcontroller 42. The microcontroller ROM 42a contains a default set of values with which to program the CODEC 30 and, in accordance with the invention, the ROM 42a also stores a program to implement the downloading of alternate values which the microcontroller 42 stores in its RAM 42b. Microcontroller 42 can also store the values within the non-volatile memory 44 if such is installed. This ROM 42a program is referred to herein as a "Configuration Module". The microcontroller 42 is connected bidirectionally to the audio path control 20 and, through a buffer 40, to the hookswitch 38 for determining which of the three audio paths are in use (handset, headset or speakerphone). Depending on the path in use the microcontroller 42 dynamically programs the variable gain amplifiers in the CODEC 30 to the appropriate value. Also through this digital connection to the audio path control 20 the handset 34 sidetone and minimum ringer volume can be appropriately set by the microcontroller 42. This path also is used to send audible feedback tone to indicate when a key depression has been accepted.

The above describes the presently preferred embodiment of the telephone 10. For convenience of implementation, portions of several of the blocks described are actually implemented in a single custom integrated circuit. These portions include of the power supply 22, the driver 18a and receiver 18b connecting to the link hybrid 18, the audio path control 20 and the speaker driver 24a. A second custom integrated circuit implements the digital data control and formatting function 28. A third custom integrated circuit implements the analog speakerphone control 24. In the presently preferred embodiment of the invention the CODEC 30 is TP3076 device manufactured by National Semiconductor Inc., the microcontroller 42 is a uPD7808H device manufactured by Nippon Electronics Corporation (NEC) Inc. and the non-volatile memory 44 is an electrically erasable programmable read-only memory (EE-PROM) CAT93C46 manufactured by Catalyst Semiconductor Inc. Of course, the practice of the invention is not limited to implementation with these or any specific type of devices.

Having thus described a presently preferred embodiment of the telephone 10 there will now be described a protocol which enables the reception and transmission of packets of digital data between the phone 10 and the PABX 14, the digital data including configuration parameters which are stored by the microcontroller 42 within the RAM 42b and within the memory 44.

The following parameters have been determined to be variable parameters. The signal power resolution of these parameters, due to the specific characteristics of the CODEC 30, is approximately 0.1 dB. In other embodiments of the invention employing a different type of CODEC the signal power resolution may be other than 0.1 dB. These parameters include the handset transmit volume, handset receive volume, headset transmit volume, headset receive volume, speakerphone transmit volume, and the speakerphone receive volume.

The handset sidetone is adjustable to two levels, namely high or low. The choice of CODEC companding is either u-Law or A-Law. Keyboard scanning is programmed to allow either two key rollover or to allow no rollover The minimum ring volume level is programmably adjustable to two levels to enable the minimum ring to be sufficiently high for all countries. The audible feedback tone is programmed to be enabled or disabled. In other embodiments of the invention multiple levels of handset sidetone, ring level and levels of audible feedback tones are readily provided.

As was previously stated, memory 44 provides non-volatile storage of the above set forth parameters. However, due to the added cost of providing the non-volatile memory 44 within the phone 10 it may be desirable to omit this form of storage for domestic (North American) phones. For phones intended for domestic use the invention provides for a default configuration which is stored within the internal ROM 42a of microcontroller 42. This default configuration is employed by the phone 10 on power up. However, for those domestic applications where it is desirable to provide for the storage of a phone serial number or some other unique identifying information the non-volatile memory 44 provides an effective and reliable storage means.

Figure 3:
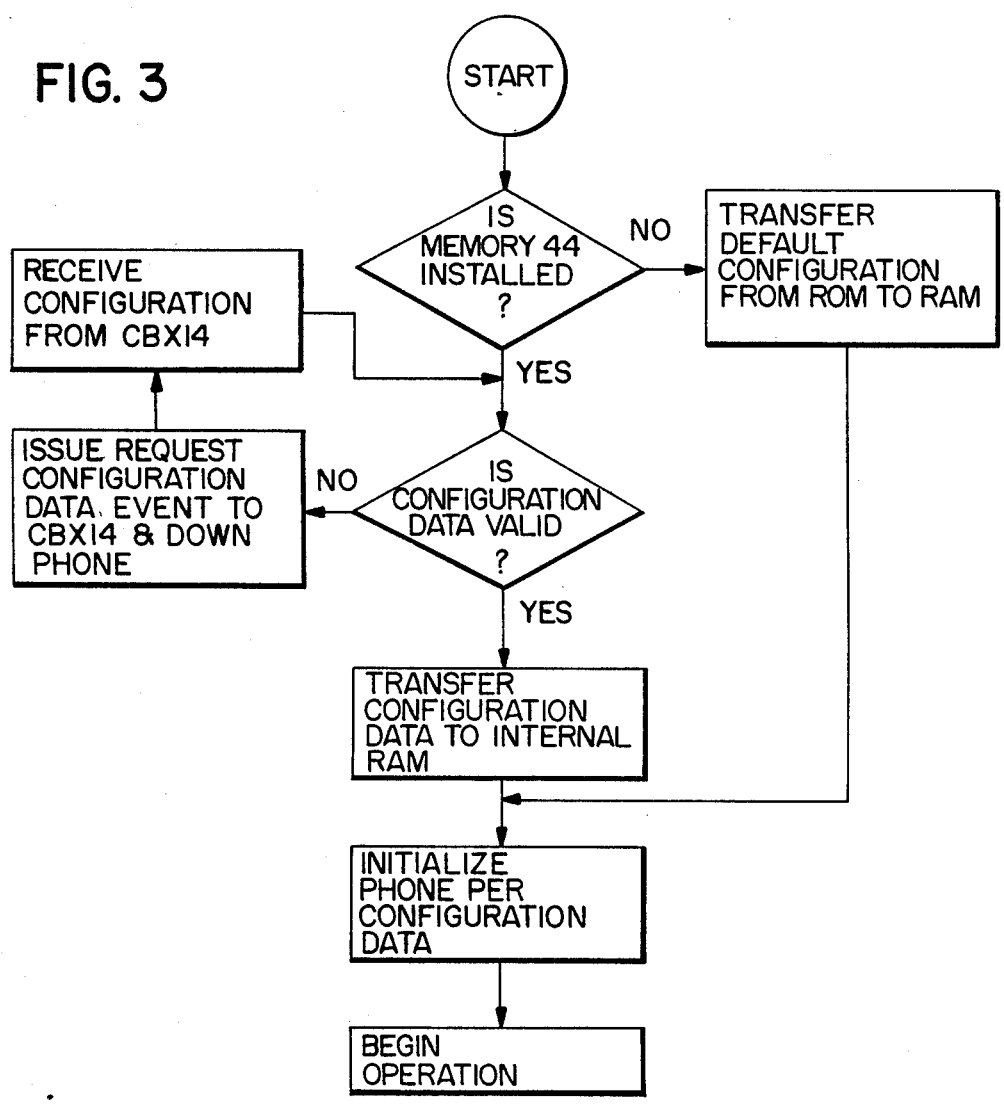
FIG. 3 is a flowchart which illustrates a power up and initialization sequence of the phone.

Further in accordance with this aspect of the invention, and as illustrated in the flowchart of FIG. 3, the microcontroller 42 determines at power up if the non-volatile memory 44 is installed within the phone 10. This can be readily accomplished by reading a predetermined location to determine if predefined data is present. If the memory 44 is determined to be installed the microcontroller 42 determines, via a checksum operation, if the memory 44 contains valid configuration data. If the configuration data is determined to be valid the microcontroller 42 transfers the configuration data to its internal RAM 42b and initializes the phone 10 accordingly. If the data is found to be invalid the microcontroller 42 requests a new download from the PABX 14 by means of a Request Configuration Data event (to be described). If the non-volatile memory 44 is determined not to be present the microcontroller 42 transfers from its internal ROM 42a to RAM 42b the default configuration and configures the phone 10 to the default parameters. Typically the default parameters are valid parameters for use with domestic phones.

The PABX 14 is enabled via a command to interrogate the phone 10 to determine what configuration parameters are in effect. If the PABX 14 determines from the phone's returned event that the default setting is not acceptable the PABX 14 correctly configures the phone 10 before any key events are recognized or any attempt is made to make a voice connection. This procedure complies with the regulations of some countries that a phone not function if not properly configured.

In addition to storing multiple bytes of information to represent the parameters described above the phone 10 also stores a data integrity indicating structure, preferably a checksum, which the microcontroller 42 employs to periodically test that the information stored in RAM 42b is valid. If the information is found to be corrupted, the microcontroller 42 "downs" the phone 10 by disabling the CODEC 30, thereby effectively disabling the voice channel. The microcontroller 42 also ignores any key events. Additionally the microcontroller 42 transmits an event message, as will be described, to the PABX 14 requesting that new configuration information be downloaded.

All data is transferred in a "packet" format, a packet including a plurality of data units. In a presently preferred embodiment of the invention a data unit consists of eight bits, or one byte. A packet comprises an initial identifying header byte, optional data byte(s), and a terminating checksum byte. A received packet is checked by the phone 10 for the presence of a valid command in the header byte, a correct checksum, and a correct length or number of bytes. If any of these packet characteristics are found to be in error, or if there is a gap between transmitted bytes which is equal to a predetermined timeout interval, a Negative Acknowledge (NAK) event packet is sent uplink to the PABX 14.

In that the phone 10 cannot determine a correct length of a command if the command byte is found to be invalid the phone 10 delays until a first timeout interval before transmitting the NAK. All information sent to the phone 10 from the first invalid command until the timeout occurs is ignored by the phone. It is the responsibility of the PABX 14 to determine the proper action to take on the reception of a NAK event from the phone 10. Proper actions include, by example, repeating the last command or resetting the phone.

If the phone 10 determines that the checksum of a command packet is invalid, or if a timeout occurs during the transmission of a valid command, the phone 10 returns a NAK immediately.

The structure of a command packet which is transmitted from the PABX 14 to the phone 10 is as follows:

|   |
|---|
| (1) Command Byte |
| (2) Byte #1 (optional) |
| (3) Byte #2 (optional) |
| (4) Byte #3 (optional) |
| ... |
| ... |
| (n + 1) Byte #n (optional) |
| (n + 2) Checksum |

The bytes transmitted are as follows:
1. Command byte—This byte has a value of 00 to $FF_{16}$, the actual value being a function of the command being sent.
2. Byte #1—This is the first data byte if present.
3. Byte #2—This is the second data byte, if present.
n+1. Byte #n—This is the last (nth) data byte, if present.
n+2. Checksum—The calculated checksum of all bytes from the command byte to the last data byte is sent as the last byte of the command.

The structure of the event packet which is transmitted to the PABX 14 from the phone 10 is as follows:

|   |
|---|
| (1) Event Byte |
| (2) Byte #1 (optional) |
| (3) Byte #2 (optional) |
| . |
| . |
| (n + 1) Byte #n (optional) |
| (n + 2) Checksum |

The bytes transmitted are as follows:
1. Event byte—This byte has a value of 00 to $FF16$, the actual value of the byte being a function of the specific event type being transmitted.
2. Byte #1—This is the first data byte, if present.
3. Byte #2—This is the second data byte, if present.
n+1. Byte #n—This is the last (nth) data byte if present.
n+2. Checksum—The calculated checksum of all bytes from the event byte to the last byte is sent as the last byte of the event.

When transmitting a command packet from the PABX 14 or when transmitting an event packet from the phone 10 the checksum is calculated by initializing a counter with a value of $55_{16}$ and subtracting therefrom the value of each byte of the packet. The least significant byte of the result, after having subtracted the last data byte, is the checksum to be transmitted.

When receiving a packet the checksum is verified by initializing a counter with $00_{16}$ and adding thereto each byte of the packet including the checksum byte. The least significant byte of the result will equal $55_{16}$ if no errors occur during transmission and reception.

By example, transmitting the hexadecimal bytes 01, 32, 34 and 32 would generate a checksum of $FFBC_{16}$, the LSB, or BC, being transmitted as the checksum. The receiver adds the data values and the checksum BC to yield a sum of $0155_{16}$, where 55 is the byte of significance.

Downlink commands are sent from the PABX 14 to the phone 10 and contain either information that the phone 10 is to use or act on or, alternatively, request the phone 10 to provide information to the PABX 14. A number of such downlink commands will now be described in detail.

A Download Configuration command is sent as follows:

1. Command Byte—Identifies the command as a Download Configuration Command.
2. High Byte of the address of the starting address in phone memory to be used. It should be noted that this command format is similar to that of the Download Data Command (described below) and that the address information of bytes #2 and #3 is ignored by the microcomputer 42 for the Download Configuration Command.
3. Low byte of the Address.
4. High byte of the number of byte to be downloaded to memory 44. For this embodiment of the invention the high byte is set to zero.
5. Low byte of the number of bytes (8, 16 or 24 decimal).
6. Configuration #1.
7. Configuration #2 (optional).
8. Configuration #n (optional).
9. Checksum Each configuration includes the following set of eight bytes:

1. Byte #1—The value of this byte sets the handset 34 transmit volume.
2. Byte #2—The value of this byte sets the handset 34 receive volume.
3. Byte #3—The value of this byte sets the headset transmit volume.
4. Byte #4—The value of this byte sets the headset receive volume.
5. Byte #5—The value of this byte sets the Speakerphone 24 transmit volume.
6. Byte #6—The value of this byte sets the Speakerphone 24 receive volume.
7. Byte #7—This is a general control byte. It contains the following five bits, three bits of the byte being always set to zero.
KTONE
RING
COMP
ROLL
SIDE These five bits are described below:
KTONE—If this bit is set to a one, keytones are disabled, otherwise they are enabled.
RING—This bit sets the level of the minimum ring volume. If set to one, minimum ring level is its highest and if zero, is lowest. The user may adjust the ring volume up to the preset maximum level through the ring volume adjustment 36a on the phone 10.
COMP—This bit sets the companding law for the phone. If COMP is set to one, A-law companding (for Europe) is selected, while zero selects u-law (for domestic phones).
ROLL—When set to a one, ROLL selects two key rollover, otherwise no rollover is enabled.
SIDE—Selects a high or low level for sidetone. If set to 1 sidetone is high, otherwise it is set to a low level.
8. Byte #8—The value of this byte is the checksum of the configuration data contained in bytes one through seven. It is the checksum returned by the Configuration Data Status event, to be described, when the PABX 14 issues a Request Status command, to be described. It is also the checksum used by the phone 10 to determine the validity of the configuration data stored in memory 44 during periodic phone integrity checks.

This checksum is calculated and verified in the manner described above.

Up to three configurations may be stored within the non-volatile memory 44, however only Configuration #1 is used at power-up.

The Download Configuration Command may cause one of the following events, namely a Request Configuration Data Event, a Download Data Status or a Negative Acknowledge Event. These events are described in detail below.

A Set Configuration/Request Status command is transmitted in the following format:

Command Byte =(nx)

Checksum where
n=0 indicates read volatile memory (RAM 42b) checksum only,
n=1, 2, 3 means load configuration 1, 2 or 3 from non-volatile memory 44 into the CODEC 30 and return the checksum of that configuration to the PABX 14, and
x=a code which identifies the command.

This command may cause one of the following events, namely a Request Configuration Data event, a Configuration Data Status event or a Negative Acknowledge event.

A Download Temporary Configuration Data command is employed to set a temporary configuration into the phone 10 for test purposes. This configuration remains in effect until any reset or Download Configuration Command is received.

The format of the command is as follows:
1. Command Byte
2. Byte #1—This byte sets the handset 34 transmit volume.
3. Byte #2 —This byte sets the handset 34 receive volume.
4. Byte #3—This byte sets the Headset transmit volume.
5. Byte #4—This byte sets the Headset receive volume.
6. Byte #5—This byte sets the Speakerphone 24 transmit volume.
7. Byte #6—This byte sets the Speakerphone 24 receive volume.
8. Byte #7—This is a general control byte. It contains five bits with three bits being always set to a zero.
KTONE
RING
COMP
ROLL
SIDE The interpretation of these bits is identical to that described above in relation to the Download Configuration Command.
9. Byte #8—This byte is the checksum of the configuration data contained in Bytes 1 through 7. This checksum is calculated and verified in the manner described above.

10. Checksum calculated and verified as described above for the entire packet.

This command may cause one of the following events, namely a Request Configuration Data event or a Negative Acknowledge event.

A Download Data Command command causes information to be downloaded into the phone 10 and stored in the non-volatile memory 44, if present. In a presently preferred embodiment of the invention the capacity of the non-volatile memory 44 is 128 bytes, of which 32 are reserved for phone configuration and testing purposes. The remaining 96 bytes are available for other uses.

It should be noted that the phone 10 makes no checks on the validity of the information sent by the PABX 14 to be stored in non-volatile memory 44. This is because the phone 10 has no prior knowledge of how the data will be organized or used. It is therefore the responsibility of the PABX 14 to check the validity of any data it retrieves from the phone's non-volatile memory 44.

The Download Data Command is transmitted as follows:
1. Command Byte
2. High Byte of the address of the starting address in memory 44 to be loaded.
3. Low byte of the starting address to be loaded.
4. High byte of the number of bytes to be downloaded to phone memory.
5. Low byte of the number of bytes.
6. Data byte #1

.
.

n+6. Data byte #n
n+7. Checksum.

This command may cause one of the following events, namely a Download Data Status event or a Negative Acknowledge event.

An Update Data Byte command causes a single byte to be updated in the non-volatile memory 44.

The command is sent as follows:
1. Command Byte
2. High byte of the address in memory 44 to be updated.
3. Low byte of the starting address to be updated.
4. The new, updated data byte to be stored at the identified address.
5. Checksum This command may cause the Negative Acknowledge event to occur.

An Upload Data command causes information to be uploaded from the non-volatile memory 44, if present. The phone 10 responds to this command with an Upload Data event, as described below.

The command is sent as follows:
1. Command Byte
2. High byte of the address of the starting address in memory 44 to be uploaded.
3. Low byte of the starting address to be uploaded.
4. High byte of the number of bytes to be uploaded from starting at the starting address.
5. Low byte of the number of bytes to be uploaded.
6. Checksum.

This command may cause one of the following events, namely an Upload Data or a Negative Acknowledge event.

A Configuration Module Selftest command instructs the phone 10 to test those functions that relate to the operation of the Configuration Module and report the status of this test with an Configuration Module Selftest Status Event, described below.

This command may cause one of the following events to occur, namely an Configuration Module Selftest Status event or a Negative Acknowledge event.

A Configuration Module Firmware Revision Level Request command instructs the phone 10 to send the revision level of the firmware associated with the microcontroller 42 to the PABX 14 by way of the Configuration Module Revision Level event, described below. The firmware revision level is stored at a predetermined location within the ROM 42a of the microcontroller 42.

This command may cause one of the following events, namely an Configuration Module Firmware Revision Level event or a Negative Acknowledge event.

A Set Analog Loopback command causes digital voice data to be converted to an analog signal which is looped back inside the CODEC 30. The analog signal is converted back to digitized voice data by the CODEC 30 and transmitted uplink to the PABX 14.

This command may cause the Negative Acknowledge event to occur.

A Set Digital Loopback command causes digital voice data written to the CODEC 30 to be sent to the PABX 14 in a subsequent timeslot without being converted, as is normally the case, to analog data. This command may cause the Negative Acknowledge event to occur.

A Clear Loopback command clears any loopback condition, such as Set Analog Loopback or Set Digital Loopback, that may be in effect. This command may cause a Negative Acknowledge event to occur.

A Read Serial Number command causes the phone 10 to upload the phone's serial number which is stored in memory 44. The phone 10 responds with a Serial Number event or with a Negative Acknowledge event.

In addition to the foregoing commands several commands are provided which permit addressing of the memory 44 by absolute addresses for storing and retrieving data therefrom. These commands are generally not employed with the PABX 14 in a field application but are intended instead for use during manufacture and testing of the phone 10.

Uplink events are directed from the phone 10 to the PABX 14 and contain information about the phone 10 or about actions that are taking place with respect to the phone 10.

A Request Configuration event is generated whenever any of the following conditions are found to exist.

A first condition exists when the microcontroller 42 determines that the data in the memory 44 is corrupted. The microcontroller 42 disables the CODEC 30, thereby disabling the audio circuitry, and ignores any key depressions until valid configuration data is downloaded by the PABX 14.

A second condition exists when any configuration downloaded to the phone 10 is found to have an incorrect checksum.

A third condition exists when the phone 10 is receiving a download of configuration data as described above and there occurs a timeout between downlink bytes. The phone 10 remains in a power-down mode until a full configuration download, without a timeout, occurs.

A Configuration Data Status event is sent in response to the Set Configuration/Request Status commands.

This event is sent in the following format:

Event Header=(nX)

Configuration Checksum

Checksum where n is the requested configuration number from the Set Configuration/Request Status Command and X is the event identifier.

If the phone 10 is properly configured, it returns the checksum of the requested configuration to the PABX 14. This returned checksum should be the same as the one sent by the PABX 14 to load the configuration. If the PABX 14 requests the status of a configuration that has not been downloaded the phone 10 returns instead a NAK event.

If the phone 10 is not configured the phone 10 returns instead the Set Configuration/Request Status event described above.

The Download Data Status event is sent in response to the Download Data Command. This event is sent with the following format:

Event Header

Status Byte

Checksum

If the returned status byte is non-zero an error was detected in the preceding download data transfer. A status byte of zero indicates that no error was detected.

An Upload Data event is sent in response to the Upload Data Command. The event is sent in the following format:

| Event Header |
| Data Byte #1 |
| Data Byte #2 |
| ... |
| Data Byte #nn |
| Checksum |

A Configuration Module Selftest Status event is sent in response to the Configuration Module selftest command. The event is sent in the following format:

Event Header

Status Byte

Checksum

The status byte contains the following bits:
S4
S3
S2
S1
ERR
LBS
NVR
CODEC
The significance of these bits is described below.
CODEC—If set to a one this bit indicates the presence of a CODEC 30 which is programmable by the microcontroller 42. If this bit is zero the CODEC is not programmable.
NVR—If set to a one this bit indicates that the non-volatile memory 44 is installed within the phone 10.
LBS—If set to a one this bit indicates that the phone is in loopback mode, either analog or digital.
ERR—If set to a one this bit indicates that an error was detected by the microcontroller 42 in the Configuration Module firmware or hardware.
S4-S1—These bits are memory size bits which indicate how much of the non-volatile memory 44 is available for use by the PABX 14.

A Configuration Module Firmware Revision event is sent in response to the Configuration Module Revision Level command. The revision level indicates the level of the firmware implementing the Configuration Module in the microcontroller 42 internal program memory and, by implication, the capabilities and/or restrictions of the Configuration Module.

A Serial Number event is sent in response to the Read Serial Number command.

This event is sent in the following format:

Event Header

Serial Number Byte #1

Serial Number Byte #2

Serial Number Byte #3

Serial Number Byte #4

Checksum

The Serial Number is a 32 bit value represented by bytes 1 through 4, with the MSB (byte 1) being the MSB of the serial number.

The Negative Acknowledge (NAK) event is generated whenever the phone 10 receives a command that it does not recognize and a timeout has occurred, when a timeout occurs during a command, or when a command with an invalid checksum is received. When a command that the phone 10 does not recognize is received the phone 10 delays for a predetermined timeout interval before sending the NAK event. This event consists of a packet having two bytes, an event header byte and a checksum byte.

As was previously stated, on all phone 10 resets by PABX 14 command, Configuration Module resets or power-on reset conditions the microcontroller 42 determines if the non-volatile memory 44 is present (FIG. 3). If the non-volatile memory 44 is present, the microcontroller 42 checks the memory 44 for a valid configuration. If such a configuration is present the microcontroller 42 loads the configuration data into its internal RAM and also into the CODEC 30. If no configuration is present the microcontroller 42 powers down the CODEC 30, ignores key events, and requests configuration data from the PABX 14 by a Request Configuration Data Event. If memory 44 is not present the microcontroller loads the North American (default) configuration into its internal RAM and into the CODEC 30 and begins operation. The default configuration is stored in the microcontroller 42 internal program memory.

It can be appreciated that the configurable telephone of the invention provides a number of valuable features including the ability to ship a single phoneset to a number of different countries, the phoneset being configured on-site for compliance with local telephone requirements. Furthermore, the phoneset is readily interrogated to determine the operational status of the phoneset and the integrity of the operating configuration.

Furthermore, and has been described, the phone 10 may store up to three different configurations. This aspect of the invention facilitates the operation of the phone with a PABX of the type which is connected to both analog and digital trunks. In such a system the phone 10 may be required to have a different loss plan for each trunk. However, the phone 10 has no knowledge of which trunk the phone is connected to until so notified by the PABX 14. The PABX 14 may have no prior knowledge of which trunk will be employed until a user begins to dial a number. As can be appreciated, the phone 10 must be capable of changing configurations during the dialing of the number and before a voice connection is made. In such a system the PABX 14 determines the destination trunk and, if necessary, reconfigures the phone 10 by way of the previously described Set Configuration command.

The Download Data and the Upload Data commands of the invention further provide a capability for the PABX 14 to store information in the phone 10 such as, by example, the name of an assigned user of the phone 10. If the phone 10 is subsequently moved to a different location the PABX 14 is enabled to retrieve this information from the phone in order to update itself to reflect the change. This function may also be accomplished by reading the phone's unique serial number via the Read Serial Number command.

While the invention has been particularly shown and described with respect to a preferred embodiment thereof, it will be understood by those skilled in the art that changes in form and details may be made therein without departing from the scope and spirit of the invention.

What is claimed is:

1. Telephone apparatus comprising:
   means for communicating telephone related information in a bidirectional manner with a telephone exchange; and
   means, coupled to the communicating means, for receiving telephone related information therefrom, the telephone related information therefrom, the telephone related information including information for specifying at least one operational configuration of the telephone, the at least one operational configuration including information for specifying at least one telephone signal power parameter, the receiving means comprising means for configuring the telephone apparatus in accordance with the received information.

2. Telephone apparatus as set forth in claim 1 wherein the receiving means further comprises means for providing telephone related status information to the communicating means for transmission therefrom.

3. Telephone apparatus as set forth in claim 2 wherein the communicating means both receives the telephone related information and transmits the telephone related status information in a digital format.

4. Telephone apparatus as set forth in claim 3 wherein the communicating means both receives the telephone related information and transmits the telephone related status information as a communication packet comprised of a first plurality of data units including an identifying data unit which identifies the communication packet as to a type of communication packet and a data integrity data unit which conveys information relating to a data integrity of the packet.

5. Telephone apparatus as set forth in claim 4 wherein at least one communication packet further comprises a second plurality of data units expressive of a telephone handset transmit volume parameter, a telephone handset receive volume parameter, a telephone headset transmit volume parameter, a telephone headset receive volume parameter, a speakerphone transmit volume parameter and a speakerphone receive volume parameter.

6. Telephone apparatus as set forth in claim 5 wherein the second plurality of data units is further expressive of an audible feedback tone parameter, a ring volume parameter, a companding law parameter, a key rollover parameter and a sidetone parameter.

7. Telephone apparatus as set forth in claim 6 and further comprising volatile memory means coupled to the receiving means for storing at least the second plurality of data units and the data integrity data unit.

8. Telephone apparatus as set forth in claim 7 and further comprising nonvolatile memory means coupled to the receiving means for storing at least the second plurality of data units and the data integrity data unit.

9. A method of configuring a telephone for operation from a location remote from the telephone, comprising the steps of:
   transmitting, from a remote location, a plurality of data units to a telephone;
   receiving the plurality of data units with the telephone;
   interpreting the plurality of data units to derive at least one telephone operating parameter therefrom, the at least one telephone operating parameter including information for specifying at least one telephone signal power parameter; and
   configuring the telephone for operation in accordance with the at least one telephone operating parameter.

10. A method as set forth in claim 9 wherein the step of receiving includes a step of storing the at least one telephone operating parameter within a memory means.

11. A method as set forth in claim 10 wherein the step of transmitting is accomplished by transmitting a packet of digital data to the telephone, the packet including an error detection data unit having a value which is expressive of a data integrity of the packet.

12. A method as set forth in claim 11 wherein the step of receiving further includes a step of verifying the data integrity of the packet in accordance with the value of the error detection data unit.

13. A method as set forth in claim 12 wherein the error detection data unit is expressive of a checksum of the data units of the packet and wherein the step of transmitting includes a step of generating a checksum for the packet by the steps of:
   initializing a first register means to $55_{16}$;
   subtracting a value of each data unit of the packet from the first register means; and setting the value of the error detection data unit equal to the least significant eight bits of the first register means.

14. A method as set forth in claim 13 wherein the step of verifying includes the steps of initializing a second register means to $00_{16}$;

adding a value of each data unit of the packet to the second register means;

comparing the least significant eight bits of the second register means to $55_{16}$; and if the least significant eight bits of the second register means do not equal $55_{16}$, indicating that the packet is in error.

15. A method as set forth in claim 14 wherein the step of indicating includes a step of transmitting a packet of data from the telephone to the remote location, the packet of data including a data unit for indicating that the received packet of data is in error.

16. A telephone for operation with a Private Automatic Branch Exchange (PABX) means, the PABX means including means for transmitting over a data link means a plurality of data units to a telephone, the PABX means further including means for receiving over the data link means a plurality of data units from the telephone, the telephone comprising:

means for receiving a plurality of data units from the data link means;

means for transmitting a plurality of data units to the data link means;

means for interpreting the plurality of data units received from the data link means to derive at least one telephone operating parameter therefrom, the at least one telephone operating parameter including information for specifying at least one telephone signal power parameter; and means for configuring the telephone for operation in accordance with the at least one telephone operating parameter.

17. A telephone as set forth in claim 16 and further comprising means, coupled to the receiving means, for storing the at least one telephone operating parameter.

18. A telephone as set forth in claim 16 wherein the PABX means transmits a packet of digital data to the telephone and wherein the telephone transmits a packet of digital data to the PABX means, each transmitted packet including an error detection data unit having a value which is expressive of a data integrity of the packet.

19. A telephone as set forth in claim 18 wherein the receiving means further comprises means for verifying the data integrity of the received packet of digital data in accordance with the value of the error detection data unit.

20. A telephone as set forth in claim 19 and further comprising a handset and a speakerphone and wherein the packet of digital data transmitted by the PABX means includes data units expressive of a handset transmit volume parameter, a handset receive volume parameter, a speakerphone transmit volume parameter and a speakerphone receive volume parameter.

21. A telephone as set forth in claim 20 and further comprising a headset and wherein the packet of digital data transmitted by the PABX means further includes data units expressive of a headset transmit volume parameter and a headset receive volume parameter.

22. A telephone as set forth in claim 20 wherein the packet of digital data transmitted by the PABX means further includes an audible feedback tone parameter, a ring volume parameter, a companding law parameter, a key rollover parameter and a sidetone parameter.

23. A telephone for operation with a Branch Exchange means, the Branch Exchange means including means for transmitting over a data link means a plurality of data units to a telephone, the Branch Exchange means further including means for receiving over the data link means a plurality of data units from the telephone, the telephone comprising:

means for receiving a plurality of data units from the data link means including at least a first type of data unit expressive of a command and a second type data unit expressive of information relating to the command;

means for transmitting a plurality of data units to the data link means;

means for interpreting a command to determine an action to be performed in response to the command;

means, responsive to the operation of the interpreting means for a first type of command, for storing the second type of data units received from the data link means;

means, responsive to the operation of the interpreting means for a second type of command, for providing the stored second type of data units to the transmitting means for transmission to the data link means; and means, responsive to the operation of the interpreting means for a third type of command, for configuring the telephone for operation in accordance with the information conveyed by the second type of data units, wherein the information conveyed by the second type of data units includes information for specifying at least one telephone signal power parameter.

24. A telephone as set forth in claim 23 wherein the information conveyed by the second type of data unit includes information for uniquely identifying the telephone from other telephones, if any, which are coupled to the Branch Exchange means.

25. A telephone as set forth in claim 23 wherein the Branch Exchange means transmits the plurality of data units as a packet of digital data to the telephone and wherein the telephone transmits the plurality of data units as a packet of digital data to the Branch Exchange means, each packet including an error detection data unit having a value which is expressive of a data integrity of the packet.

26. Telephone apparatus comprising means for communicating telephone related information in a bidirectional manner with a telephone exchange, the telephone apparatus further comprising:

means, coupled to the communicating means, for receiving telephone related information therefrom, the telephone related information including information for specifying at least two operational configurations of the telephone apparatus, each of the at least two operational configurations including information expressive of at least one telephone signal power parameter;

means, coupled to the receiving means, for storing the at least two operational configurations;

means, coupled to the communicating means, for interpreting the telephone related information to determine which of the stored operational configurations is required for use; and means, coupled to the interpreting means, for configuring the telephone apparatus in accordance with the determined one of the stored operational configurations.

27. Telephone apparatus as set forth in claim 26 wherein the receiving means further comprises means for providing telephone related status information to the communicating means for transmission therefrom.

28. Telephone apparatus as set forth in claim 27 wherein the communicating means both receives the telephone related information and transmits the telephone related status information as a communication packet comprised of a first plurality of data units including an identifying data unit which identifies the communication packet as to a type of communication packet and a data integrity data unit which conveys information relating to a data integrity of the packet.

29. Telephone apparatus as set forth in claim 28 wherein each of the operational configurations is transmitted as a communication packet having data units expressive of a telephone handset transmit volume parameter, a telephone handset receive volume parameter, a telephone headset transmit volume parameter, a telephone headset receive volume parameter, a speakerphone transmit volume parameter, a speakerphone receive volume parameter, an audible feedback tone parameter, a ring volume parameter, a companding law parameter, a key rollover parameter and a sidetone parameter.

30. A method of operating a telephone that is coupled to a branch exchange means, the method including a step of initializing the telephone by the steps of:
 determining if a first memory means is installed within the telephone;
 if the first memory means is found to be installed, determining if a valid operational configuration is stored within the first memory means;
 if a valid operational configuration is determined to be stored within the first memory means, configuring the telephone in accordance with the valid operational configuration;
 if a valid operational configuration is determined not to be stored within the first memory means, requesting the branch exchange means to provide a valid operational configuration; and
 if the first memory means is determined not to be installed, configuring the telephone in accordance with a default operational configuration stored within a second memory means, wherein the operational configuration and the default operational configuration each include information for specifying at least one telephone signals power parameter.

31. A method as set forth in claim 30 and, if the first memory means is installed, further comprises the steps of:
 periodically verifying a data integrity of an operational configuration stored within the first memory means; and
 if the data integrity of the stored operational configuration is found to be violated, notifying the branch exchange means.

* * * * *

UNITED STATES PATENT AND TRADEMARK OFFICE
CERTIFICATE OF CORRECTION

PATENT NO. : 4,928,306

DATED : May 22, 1990

INVENTOR(S) : Biswas et al.

It is certified that error appears in the above—identified patent and that said Letters Patent is hereby corrected as shown below:

Claim 1, col. 13, lines 50-51 delete the phrase "therefrom, the telephone related information".

Signed and Sealed this

Nineteenth Day of November, 1991

Attest:

HARRY F. MANBECK, JR.

*Attesting Officer*  *Commissioner of Patents and Trademarks*